(12) United States Patent
Markvart et al.

(10) Patent No.: US 8,191,577 B2
(45) Date of Patent: Jun. 5, 2012

(54) FLOW ADJUSTMENT VALVE

(75) Inventors: Arne Markvart, Silkeborg (DK); Bent Karsten Rasmussen, Silkeborg (DK); Morten Christensen, Auning (DK); Jens Pagh Schmidt, Herning (DK); Claus Fisker, Skanderborg (DK); Lars Therkelsen, Beder (DK)

(73) Assignee: Danfoss A/S, Nordborg (DK)

( * ) Notice: Subject to any disclaimer, the term of this patent is extended or adjusted under 35 U.S.C. 154(b) by 469 days.

(21) Appl. No.: 12/444,753

(22) PCT Filed: Oct. 5, 2007

(86) PCT No.: PCT/DK2007/000433
§ 371 (c)(1),
(2), (4) Date: Jun. 30, 2009

(87) PCT Pub. No.: WO2008/043361
PCT Pub. Date: Apr. 17, 2008

(65) Prior Publication Data
US 2010/0163770 A1 Jul. 1, 2010

(30) Foreign Application Priority Data
Oct. 10, 2006 (DE) .......................... 10 2006 047 879

(51) Int. Cl.
*F16K 5/10* (2006.01)
(52) U.S. Cl. ................ 137/614.17; 137/614.18; 251/96; 251/118

(58) Field of Classification Search .................... 251/95, 251/96, 98, 118, 315.01; 137/613, 614.16, 137/614.17, 614.18
See application file for complete search history.

(56) References Cited

U.S. PATENT DOCUMENTS

| 2,140,292 | A | * | 12/1938 | Jensen | .......................... | 251/209 |
| 2,209,397 | A | * | 7/1940 | Gannestad | ................. | 137/637.3 |
| 2,341,411 | A | | 10/1942 | Ojalvo | | |
| 3,526,249 | A | | 9/1970 | Baustian | | |

(Continued)

FOREIGN PATENT DOCUMENTS

DE 26 06 042 8/1977

(Continued)

OTHER PUBLICATIONS

International Search Report for PCT/DK2007/000433 dated Jan. 29, 2008.

*Primary Examiner* — John Fristoe, Jr.
(74) *Attorney, Agent, or Firm* — McCormick, Paulding & Huber LLP

(57) ABSTRACT

The invention relates to a flow adjustment valve (1) comprising a valve housing (2) having a flow channel (3) in which a throttle unit (4, 11) having an adjustable throttle element (11) and a shut-off unit having a shut-off element (4) which blocks the flow channel (3) in a closed position are arranged, the shut-off element (4) being actuatable from the outside by means of a handle (16). The aim of the invention is to simplify the handling of a flow adjustment valve of the aforementioned type. For this purpose, the throttle element (11) can also be actuated by means of the handle (16).

12 Claims, 1 Drawing Sheet

U.S. PATENT DOCUMENTS

| | | | |
|---|---|---|---|
| 3,860,032 A * | 1/1975 | Rogers | 137/614.17 |
| 4,150,692 A | 4/1979 | Wolf | |
| 4,230,154 A * | 10/1980 | Kalbfleish | 137/614.17 |
| 4,700,928 A | 10/1987 | Marty | |
| 5,741,003 A * | 4/1998 | Segien, Jr. | 251/95 |
| 6,273,397 B1 * | 8/2001 | Schultz et al. | 251/149.6 |
| 7,735,514 B2 * | 6/2010 | Marstorp et al. | 137/501 |

FOREIGN PATENT DOCUMENTS

| | | |
|---|---|---|
| DE | 3638516 A1 | 5/1988 |
| DE | 298 18 404 U1 | 4/1999 |
| DE | 10339577 A1 | 3/2005 |
| EP | 1013976 A2 | 6/2000 |
| JP | 3157571 A | 7/1991 |
| WO | 0171289 A1 | 9/2001 |

* cited by examiner

FLOW ADJUSTMENT VALVE

CROSS REFERENCE TO RELATED APPLICATION

This application is entitled to the benefit of and incorporates by reference essential subject matter disclosed in International Patent Application No. PCT/DK2007/000433 filed on Oct. 5, 2007 and German Patent Application No. 10 2006 047 879.7 filed Oct. 10, 2006.

FIELD OF THE INVENTION

The invention concerns a flow adjustment valve with a valve housing comprising a flow channel, in which is arranged a throttle unit with an adjustable throttle element and a shut-off unit comprising a shut-off element blocking the flow channel in a closed position, the shut-off element being actuatable from the outside by means of a handle.

BACKGROUND OF THE INVENTION

Such a flow adjustment valve is, for example, known from WO 01/71289 A1.

In liquid-filled systems, such as heating and refrigeration systems, such a flow adjustment valve is used to set a hydraulic balance between different sections of the system. For this purpose, the throttle unit is set so that with given pressure conditions a certain flow through the flow adjustment valve can take place. This flow is then the flow that is allocated to the corresponding section of the system. Usually, such a flow adjustment valve is provided with two pressure measuring outputs, by means of which a pressure difference across a throttle can be determined, this pressure difference again being convertible into a flow. The throttle can be a constant throttle. However, it is also possible to use the throttle unit as throttle. In this case, additionally to the pressure difference, information about the position of the throttle element or the opening width of the throttle unit is required.

In many cases, however, the flow adjustment valve is also used as shut-off valve, to enable shutting off the corresponding section of the system, if maintenance work is required.

With the flow adjustment valve known from WO 01/71289 A1, the shut-off element that is formed as a ball, can be rotated by means of a handle to a closed position, in which it blocks the flow channel, or to an open position, in which a passage through the shut-off element is brought to overlap the flow channel.

The handle has an opening, through which a tool can be inserted, by means of which the throttle element can be set.

When, once, such a flow adjustment valve has been set, a further setting will usually not be required. Changes of the setting usually only occur in connection with changes in the system. For this reason, such a flow adjustment valve is often located in inaccessible positions, for example in a canal, under a roof, or the like. However, this location makes it difficult for an installer to reach the flow adjustment valve.

BRIEF SUMMARY OF THE INVENTION

The invention is based on the task of simplifying the handling of the flow adjustment valve.

With a flow adjustment valve as mentioned in the introduction, this task is solved in that the throttle element can also be activated by the handle.

With such an embodiment, it is no longer required for the installer to handle a tool, that is, to insert it into the flow adjustment valve, to set the throttle element. On the contrary, the handle can be used, which is accessible from the outside anyway. Thus, the handle has a double function. On the one side it can be used to bring the shut-off unit into a closed state, so that the corresponding section of the system is shut-off. On the other side, the handle can be used to set the flow.

It is preferred that the handle and the shut-off element are mutually connectable. With this embodiment, it is possible to perform the activation of the shut-off element and the activation of the throttle element independently of one another. At least, the throttle element can be adjusted by means of the handle, without causing the shut-off element to move at the same time. This further simplifies the handling.

Preferably, the throttle element is arranged at a spindle, which is located adjustably in a tappet, to which the shut-off element is connected. Via the tappet the handle acts upon the shut-off element, when the handle activates the shut-off element. If only the throttle element has to be adjusted, the handle only acts upon the throttle element, namely via the spindle. In this case, a coupling between the handle and the shut-off element is disconnected.

It is advantageous, if the spindle engages the tappet via a threaded pair. This is particularly the case, if the shut-off element is the ball of a ball valve. When the handle is rotated without having an active connection to the shut-off element, the rotation will axially displace the spindle in the tappet, so that the position of the throttle element changes. When, however, the handle has been brought to engage the tappet, so that an active connection exists between the handle and the shut-off element, the spindle will be turned together with the handle. As, however, because of the simultaneous rotation of the tappet by means of the handle, a relative rotation between the spindle and the tappet does not occur, the position of the throttle element will remain unchanged, when the shut-off unit is activated. After the blocking or after the discontinuation of the blocking, a new setting of the throttle unit is not required. The once chosen setting is maintained, independently of, how often the shut-off unit is activated. It is not significant either, if, when closing or opening the shut-off unit, the handle is rotated by one fourth, three fourth, five fourth of a circle or by other angles. In any case, the setting of the throttle element is maintained.

Preferably, the handle is translatorically displaceable, a movement in a first direction creating an active connection to the shut-off element and a movement in a second direction, which is opposite to the first direction, disengaging the active connection. This is a relatively simple way of creating and disengaging the active connection between the handle and the shut-off element. Also in inaccessible places the installer can simply displace the handle, if he wishes to activate the shut-off unit or merely to adjust the throttle unit.

It is preferred that the handle is a twist handle, which is rotatably and axially displaceably arranged at the valve housing. In order to activate the shut-off device, the handle must be axially displaced. Then, it can be rotated to activate the shut-off device. If, however, only an adjustment of the throttle unit is desired, the handle is axially displaced in the opposite direction, so that it only adjusts the throttle element, but does not activate the shut-off element.

Preferably, a blocking device is provided, with which the handle can be blocked in a position, in which it is in active connection to the shut-off element. Usually, it is endeavoured to keep a once made adjustment of the throttle unit, so that the throttle unit cannot be adjusted by mistake. This is simply achieved in that the handle is brought into an active connection to the shut-off element and blocked in this position. In this case, only the shut-off device is actuatable, the throttle unit, however, cannot be displaced.

It is preferred that the blocking device comprises a prestressed spring arrangement, which activates the blocking device in the position of the handle, in which it is in active connection to the shut-off element. When the setting of the throttle unit has taken place, the handle can simply be displaced to the active connection to the shut-off unit, which activates the blocking device. For example, under the influence of the prestressed spring arrangement, it can snap into a holder. An automatic disconnection of the blocking device is then not possible. On the contrary, an installer has to actively disconnect blocking device.

Preferably, in the blocked state, the handle covers a fixing nut. In this case, it is not possible to dismount the handle from the flow adjustment valve. The fixing nut is covered by the handle itself. This further secures the throttle unit from being displaced by unauthorized persons.

Preferably, a closed position indication is arranged at the handle. In many cases, the angle position of the handle will not indicate, whether or not the shut-off device blocks the passage through the flow channel. A closed position indication, however, can indicate the corresponding state.

It is preferred that the closed position indication is activated by the displacement of the handle. If the handle is merely used to displace the throttle unit, the handle can be rotated at will, without making the closed position indication visible. If, however, the handle has been displaced, the closed position indication shows whether or not the shut-off element blocks the flow channel.

Preferably, the shut-off element is actuatable via a torque application surface, which is covered by the handle, when the handle is mounted. Thus, it is also possible to realise a blocking of the section of the system, when the handle has been dismounted and is missing. Also this is a measure performed by many installers to prevent an unwanted adjustment of the throttle unit. If then a blocking of the section of the system is required for a short while, because there has been an emergency, the torque application surface, for example a normal hexagon, provides the opportunity of utilizing the blocking function of the flow adjustment valve by means of another tool.

BRIEF SUMMARY OF THE DRAWINGS

In the following, the invention is described on the basis of a preferred embodiment in connection with the drawings, showing.

DETAILED DESCRIPTION OF THE PREFERRED EMBODIMENTS

A flow adjustment valve 1 comprises a valve housing 2, in which a flow channel 3 is arranged.

Figure 1:
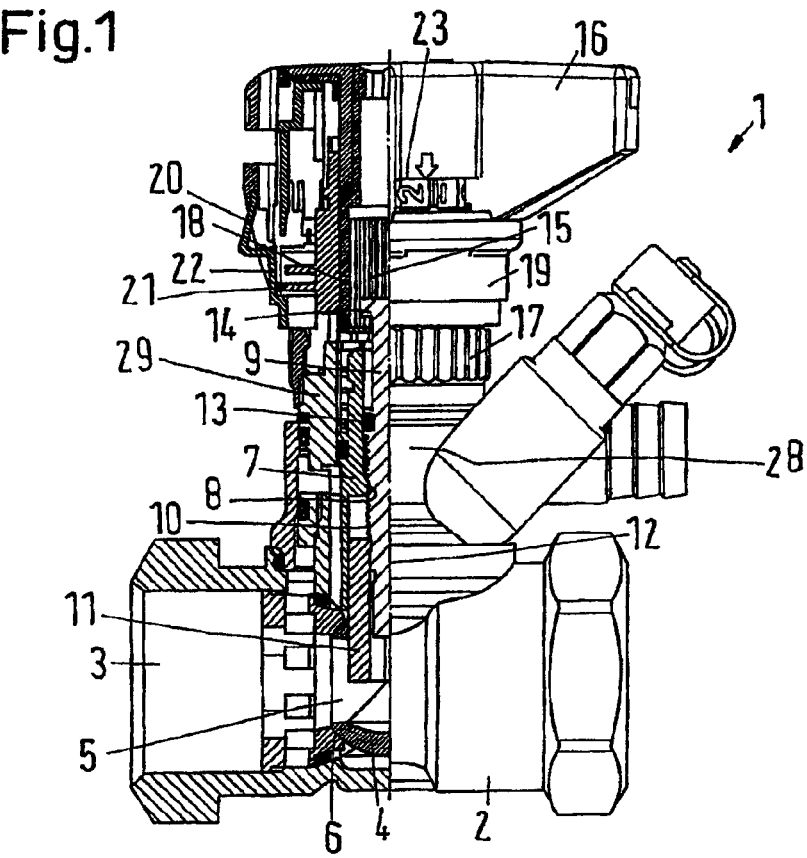
FIG. 1 is a side view of a flow adjustment valve, partially in section I-I according to FIG. 3.

In the flow channel 3 is arranged a shut-off unit with a shut-off element 4 in the form of a ball, the ball having a passage 5, so that in the position shown in FIG. 1 the flow adjustment valve is open. In the position shown in FIG. 2 of the shut-off element 4, the passage 5 is arranged transversally to the flow channel 3. Here, the flow adjustment valve 1 is blocked. The shut-off element 4 interacts with a valve seat 6.

The shut-off element 4 is unrotatably connected to a tappet 7. When the tappet 7 is rotated, also the shut-off element 4 is rotated to release or block the flow channel 3.

The tappet 7 has an inner thread 8, into which a spindle 9 with an outer thread 10 is screwed. On the spindle 9 is fixed a throttle element 11 that is displaceable in parallel to the rotation axis 12 by a rotation of the spindle 9. A displacement of the throttle element 11 will more or less release the passage 5 through the shut-off element 4.

In relation to the tappet 7, the spindle 9 is sealed by a sealing 13. Together with the shut-off element 4, the throttle element 11 forms a throttle unit.

At its upper end, the spindle 9 has a diameter expansion 14, which is provided with an outer toothing that engages an inner toothing 15, which is formed in a handle 16. The handle 16 is held on the valve housing 2 by means of a union nut 17.

The inner toothing 15 makes the connection between the diameter expansion 14 of the spindle 9 and the handle 16, which is formed as a twist handle, unrotatable. However, in the axial direction the spindle 9 is displaceable in relation to the handle 16, which is used for two purposes. Firstly, it is possible to displace the spindle 9 in the axial direction in relation to the twist handle 16, when the throttle element 11 is adjusted. Secondly, however, it is also possible to displace the twist handle 16 in relation to the valve housing 2 to make an extension 18 of the handle 16 engage the tappet 7.

In FIG. 1 the handle 16 is in a position, in which it is not coupled with the tappet 7. In this case the rotation of the handle 16 will merely rotate the spindle 9 in the tappet 7. As the tappet 7 is held in a stationary manner in the valve housing 2, the rotation of the handle 16 will then cause a displacement of the throttle element 11 and thus an adjustment of the free cross-section of the passage 5.

Figure 2:
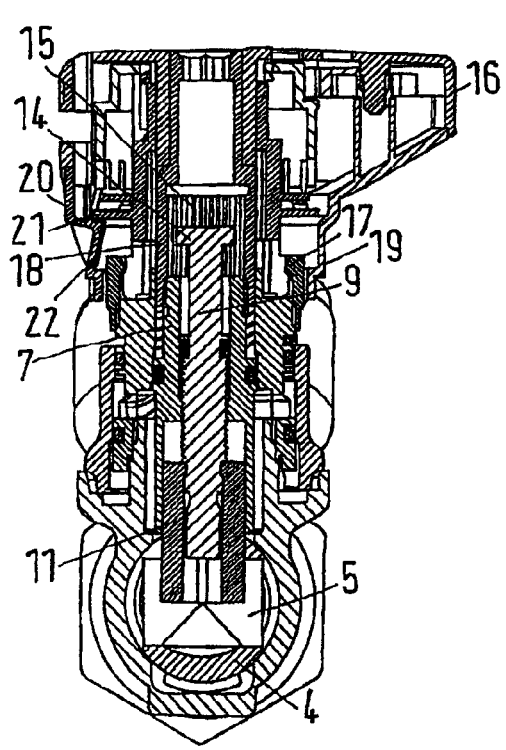
FIG. 2 is a sectional view II-II according to FIG. 3.

FIG. 2 shows a situation, in which the handle 16 has been displaced in the direction of the valve housing 2, so that the extension 18 engages the tappet 7. In this situation, the handle 16 is rotatably coupled with the shut-off element 4. In this situation, a rotation of the handle 16 will only cause a corresponding rotation of the shut-off element, that is, a blocking or a release of the flow channel 3.

When the handle 16 rotates, the spindle 9 will also rotate, as the diameter extension 14 still engages the inner toothing 15. As, however, at the same time also the tappet 7 rotates, a relative rotation between the spindle 9 and the tappet 7 does not occur. Thus, the axial position of the spindle 9 in the tappet 7 and thus also the position of the throttle element 11 in the passage 5 does not change during a rotation of the handle 16. This means that the setting of the throttle arrangement 5, 11 is maintained.

In the direction of the valve housing 2, the handle 16 has an apron 19, which covers the union nut 17, when the handle 16 is in the position shown in FIG. 2, that is, when the handle 16 is in active connection to the shut-off element 4.

The handle 16 has one or more spring elements 20, which are prestressed radially outwards. The spring element 20 is held in the prestressed state by a circumferential flange 21, which acts upon an arm 22 of the spring element 20.

When the handle 16 has been axially displaced in the direction of the valve housing 2, the arm 22 engages behind the flange 21, so that the handle 16 is locked for a return movement away from the valve housing 2. As, in the locked state, the arm 22 is radially inside the apron 19, it is not immediately accessible from the outside. A tool has to be used to bend the arm 22 so far outwards that the locking of the handle 16 is released.

Figure 3:
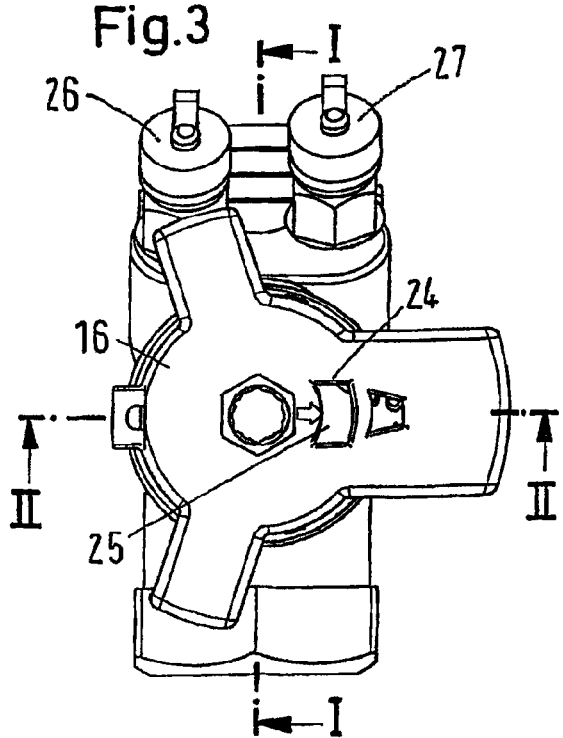
FIG. 3 is a top view of a flow adjustment valve.

The handle 16 has at least one window 23, through which numbers or other symbols are visible, which indicate the rotation angle of the handle 16. Thus, also the position of the throttle element 11 can be determined. FIG. 1 shows a window on the circumference of the handle 16. FIG. 3 shows a further window 24 on the front side of the handle 16.

The window 24 is also used as closed position display. When the handle 16 has been displaced to the position shown in FIG. 2, in which it engages the shut-off element 4, a marking 25 will appear in the window 24, when the handle 16 is rotated to the closed position of the shut-off element 4. When, however, the handle 16 is in the position shown in FIG. 1, in which it does not engage the shut-off element 4, the marking 25 will not appear in the window 24, regardless of the rotation position of the handle 16.

In a manner not shown in detail, the tappet 7 has a torque application surface, which is, however, only accessible, when the handle 16 is dismounted. Thus, it is also possible to activate the shut-off element 4, when the handle 16 is missing.

Two measuring outputs 26, 27 are provided to guide the pressures on both sides of the throttle position formed by the throttle element 11 to the outside. The measuring outputs 26, 27 are located on a flange 28, which is rotatably arranged on a pipe stub 29 projecting from the valve housing 2 at approximately right angles to the flow channel 3. Thus, the measuring outputs 26, 27 are accessible from several directions.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A flow adjustment valve with a valve housing comprising a flow channel, in which is arranged a throttle unit with an adjustable throttle element and a shut-off unit comprising a shut-off element blocking the flow channel in a closed position, the shut-off element being actuatable from the outside by means of a handle, wherein the handle is translatorically adjustable, so that in a first position of the handle, the shut-off element, not, however, the throttle element, is adjusted, and in a second position of the handle, the throttle element, not, however, the shut-off element is adjusted.

2. The valve according to claim 1, wherein the handle and the shut-off element are mutually connectable.

3. The valve according to claim 1, wherein the throttle element is arranged at a spindle, which is located adjustably in a tappet, to which the shut-off element is connected.

4. The valve according to claim 3, wherein the spindle engages the tappet via a threaded pair.

5. The valve according to claim 1, wherein a movement in a first direction creates an active connection to the shut-off element and a movement in a second direction, which is opposite to the first direction, disengages the active connection.

6. The valve according to claim 5, wherein the handle is a twist handle, which is rotatably and axially displaceably arranged at the valve housing.

7. The valve according to claim 5, wherein a blocking device is provided, with which the handle can be blocked in a position, in which it is in active connection to the shut-off element.

8. The valve according to claim 7, wherein the blocking device comprises a prestressed spring arrangement, which activates the blocking device in the position of the handle, in which it is in active connection to the shut-off element.

9. The valve according to claim 7, wherein in the blocked state the handle covers a fixing nut.

10. The valve according to claim 1, wherein a closed position indication is arranged at the handle.

11. The valve according to claim 10, wherein the closed position indication is activated by the displacement of the handle.

12. The valve according to claim 1, wherein the shut-off element is actuatable via a torque application surface, which is covered by the handle, when the handle is mounted.

* * * * *